US010372852B2

(12) United States Patent
Kawa et al.

(10) Patent No.: US 10,372,852 B2
(45) Date of Patent: Aug. 6, 2019

(54) MEASUREMENT OF AGGRESSOR/VICTIM CAPACITIVE COUPLING IMPACT ON TIMING

(71) Applicant: Synopsys, Inc., Mountain View, CA (US)

(72) Inventors: Jamil Kawa, Campbell, CA (US); Thu Nguyen, Palo Alto, CA (US); Shih-Yao Christine Sun, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 10 days.

(21) Appl. No.: 14/748,219

(22) Filed: Jun. 23, 2015

(65) Prior Publication Data
US 2015/0370938 A1 Dec. 24, 2015

Related U.S. Application Data

(60) Provisional application No. 62/016,592, filed on Jun. 24, 2014.

(51) Int. Cl.
*G06F 17/50* (2006.01)

(52) U.S. Cl.
CPC ...... *G06F 17/5036* (2013.01); *G06F 2217/82* (2013.01); *G06F 2217/84* (2013.01)

(58) Field of Classification Search
CPC ............ G06F 17/5036; G06F 2217/82; G06F 11/2273; G06F 17/5068; G06F 17/505; G06F 17/5054; G06F 17/5072; G06F 2217/84; G06F 17/5022; G06F 17/5031; G06F 17/5045; G06F 17/5063; G06F 17/5077; G06F 13/4077; G06F 1/1658; G06F 12/0292; G06F 12/06; G06F 12/0638; G06F 13/40; G06F 13/4291; G06F 1/3296; G06F 13/4072; G06F 12/0207; G06F 2203/04101; G06F 2203/04104; G06F 2203/04107; G06F 2203/04808; G06F 3/017; G06F 3/0346; G06F 3/0416; G06F 3/044; H01L 2224/49175; H05K 2201/0715; H05K 2201/09236; G11C 11/40611; G11C 29/023; G11C 29/025; G11C 29/06; G11C 11/40; G11C 29/36; G11C 29/50; H04W 72/0473; H04W 72/085; H04W 80/02; H04B 1/44; H04B 15/00; H04B 1/525; H04L 5/0005; H04L 25/0276
USPC ................................................... 716/118–125
See application file for complete search history.

(56) References Cited

U.S. PATENT DOCUMENTS 8,214,781 B1 * 7/2012 Liu ...................... G06F 17/5036
716/106
8,595,669 B1 * 11/2013 Keller ................. G06F 17/5036
716/106
2002/0166101 A1 * 11/2002 Casavant .............. G06F 17/505
716/114

(Continued)

*Primary Examiner* — Binh C Tat
(74) *Attorney, Agent, or Firm* — HIPLegal LLP; Judith Szepesi

(57) ABSTRACT

A circuit for modeling capacitive coupling comprising a victim line to be tested, a first aggressor line, running alongside the victim line, creating a coupling capacitance between the victim line and the first aggressor line, and a sensor circuit coupled to the victim line, to detect effects of the first aggressor line on the victim line, the sensor circuit measuring timing effects in pseudo-real time.

18 Claims, 7 Drawing Sheets

(56) References Cited

U.S. PATENT DOCUMENTS

| | | | | |
|---|---|---|---|---|
| 2002/0174408 A1* | 11/2002 | Naffziger | ............. | G01R 31/002 |
| | | | | 716/115 |
| 2003/0229873 A1* | 12/2003 | Casavant | .............. | G06F 17/505 |
| | | | | 716/115 |
| 2006/0190881 A1* | 8/2006 | Su | ....................... | G06F 17/5036 |
| | | | | 716/115 |
| 2006/0288320 A1* | 12/2006 | Murgai | ..................... | G06F 1/10 |
| | | | | 716/104 |
| 2008/0077900 A1* | 3/2008 | Oh | ...................... | G06F 17/5022 |
| | | | | 716/114 |
| 2009/0077515 A1* | 3/2009 | Sinha | ................. | G06F 17/5036 |
| | | | | 716/115 |
| 2009/0307645 A1* | 12/2009 | Buck | .................. | G06F 17/5036 |
| | | | | 716/115 |
| 2012/0239371 A1* | 9/2012 | Tehrani | .............. | G06F 17/5036 |
| | | | | 703/14 |

* cited by examiner

MEASUREMENT OF AGGRESSOR/VICTIM CAPACITIVE COUPLING IMPACT ON TIMING

RELATED APPLICATION

The present invention claims priority to U.S. Provisional Application No. 62/016,592, filed on Jun. 24, 2015, which is incorporated herein in its entirety.

FIELD

The present invention relates generally to Aggressor/Victim capacitive coupling impact on timing evaluation of circuits.

BACKGROUND

Within integrated circuits, a signal has to propagate through one or more paths consisting of one or more circuit elements as well as through interconnect connecting these circuit elements in a finite amount of time. This finite amount of time is known as the timing budget, and is usually determined by the dock frequency of the system encompassing such path(s). The process of establishing that the propagation delay of a signal or a set of signals falls within the timing budget across a variety of operating voltage, process corner, and temperature conditions is known as timing closure.

An integrated circuit is usually composed of blocks. Blocks in turn are composed of logic and memory elements and basic circuit elements connected by interconnect to perform a desired function. Basic and advanced logic elements are usually built and pre-characterized for a set of loads and operating conditions, and organized in to logic libraries and memory compilers. A segment of interconnect driven by a circuit element and connected to other logic elements or to a final load such as an output pad is referred to as a net. A net can have many active or passive circuit elements connected to it.

Static timing analyzers are utilized to check if a path meets the timing budget. This is done through the summation of delay for each element in a path for the particular interconnect load that the element is driving. Logic libraries have such information pre-characterized and stored through a combination of look-up tables (LUT), equations, and de-rating curves.

FIG. 1 is an exemplary circuit showing basic representation of the aggressor/victim timing problem. The delay of the path extending from the victim input 10 to the victim output 40 is impacted by an aggressor net. This impact is represented by capacitive effect 20. The extent of the impact of the aggressor switching on the delay of the victim path is determined by the difference in phase between the victim and the aggressor 30 and associated net and by the degree of alignment between the two switching signals.

As the size of integrated circuits shrink, the logic and memory elements and basic circuit elements as well as spacing between interconnect elements they contain also shrink. As spacing between interconnect elements shrinks, the impact of capacitive coupling interaction between interconnect elements increases in significance. Accounting for the impact of capacitive coupling interaction in an accurate fashion becomes critical.

FIG. 2A illustrates the impact on the transition of a signal when an aggressor in the immediate vicinity is simultaneously switching in an out-of-phase fashion. The dotted line describes the ideal switching of the signal while the solid line indicates the actual switching and the corresponding timing impact on the transition caused by the switching of the aggressor neighbor. Therefore, timing delay 50 results in the low-to-high transition of the victim circuit due to the aggressor circuit timing and timing delay 60 results in the high-to-low transition of the victim circuit due to the aggressor circuit.

Referring to FIG. 2B, the switching behavior of the victim output in the presence of a capacitively coupled and simultaneously switching aggressor is represented through timing windows 100 and 110 spanning the impact of a fully incident in-phase aggressor to a fully incident out-of-phase aggressor.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The objective of this invention is to accurately characterize the timing impact of the simultaneous switching of an aggressor or a set of aggressors on a switching signal (the victim) in the presence of capacitive coupling between the nets driven by the aggressors and the net driven by the victim. In one embodiment, a ring oscillator circuit is utilized to allow the capture of small timing increments hard to capture through direct measurement techniques. Because the change in the ring oscillator's frequency is immediate for any variation in voltage, the use of the ring oscillator circuit enables the capture of small effects in pseudo-real time. In one embodiment, the system allows adjustment of the signals from constructive to destructive interference. In one embodiment, this information is used to build a characterization table, which may be used in circuit design.

Figure 1:
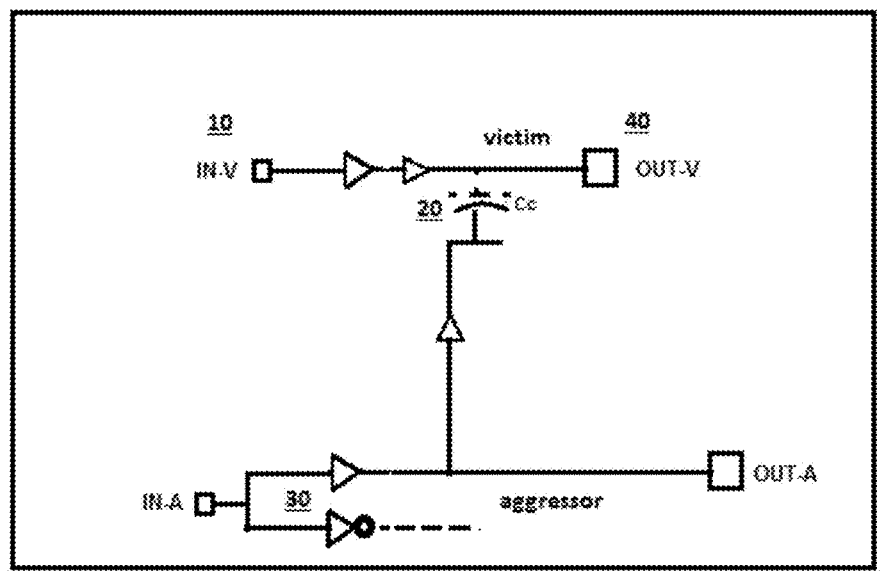
FIG. 1 is a diagram of a classical circuit representation of capacitive coupling of an aggressor/victim pair.
Figure 2A:
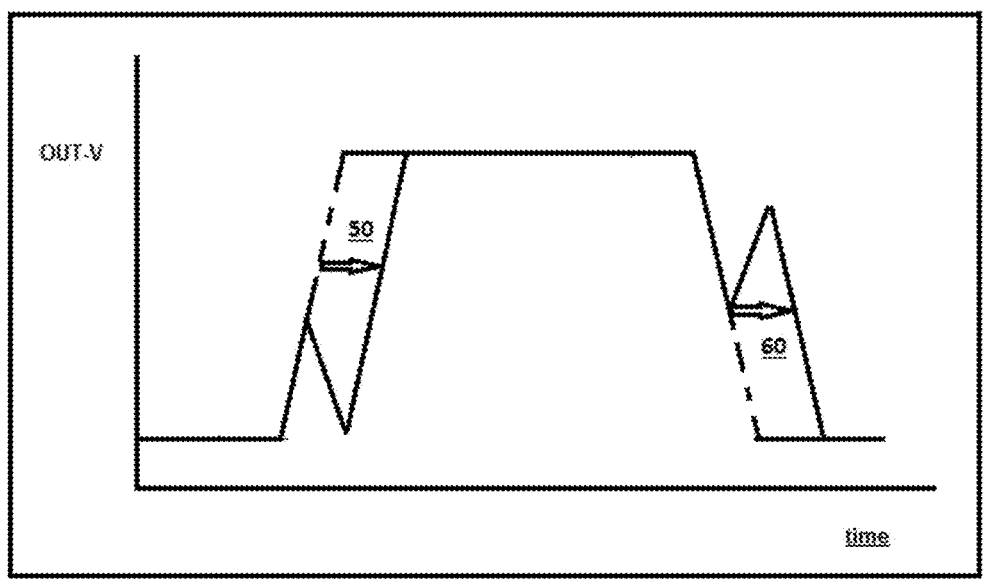
FIG. 2A is timing diagram presentation of the impact on the transition of the output signal of a transitioning victim in the presence of an aggressor switching in opposite phase.
Figure 2B:
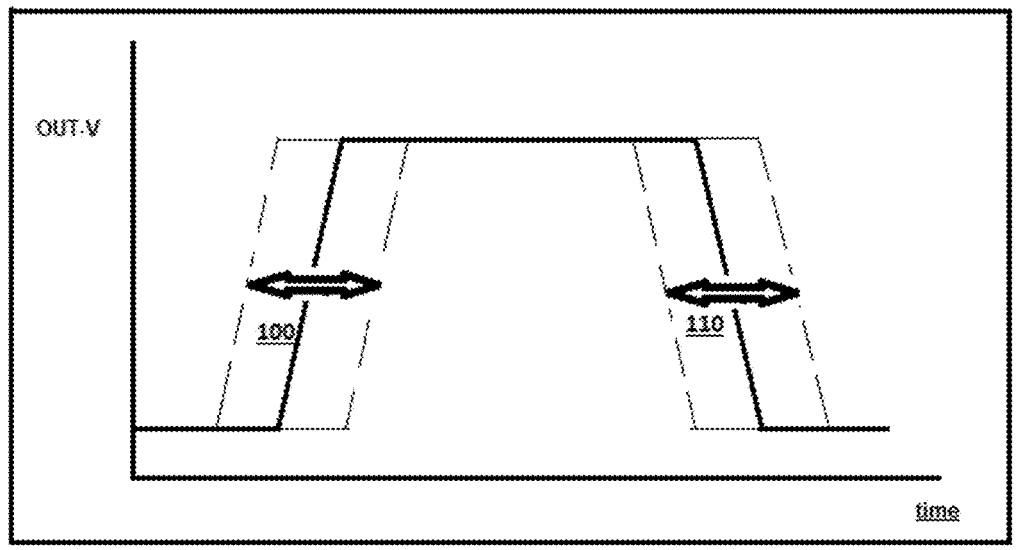
FIG. 2B is a representative of the switching timing window of a victim's transitioning output in the presence of an aggressor switching in phase or out of phase with the victim.
Figure 3:
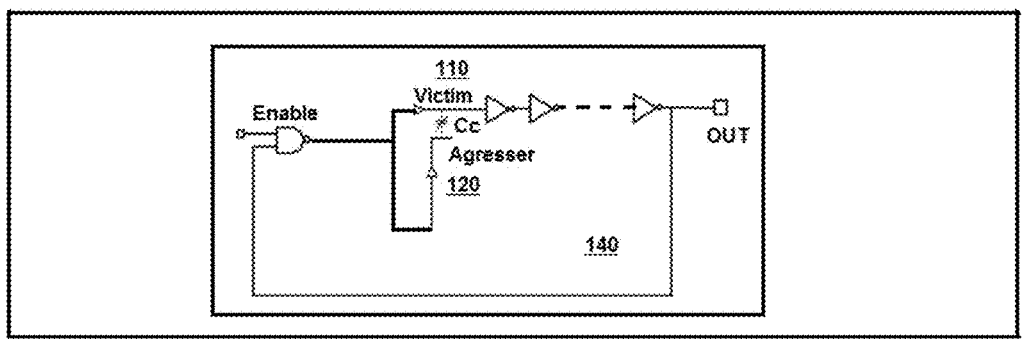
FIG. 3 is a circuit diagram of one embodiment of the invention.

FIG. 3 is a basic circuit diagram of one embodiment of the invention. A victim line 110 has an aggressor line 120 alongside it. In one embodiment, the two lines are parallel, or nearly parallel. In one embodiment, the two lines are parallel for at least a portion of their length. The exact configuration of the relationship between the victim line and aggressor line need not be parallel, and the term "alongside" refers to two lines that do not intersect but rather run near each other.

The victim line and aggressor line are coupled to each-other through one or more coupling capacitances Cc. The output of the victim line is an input into a ring oscillator 140, which translates the output voltage of the victim line into a frequency. The output of the ring oscillator is fed back to the victim and the aggressor lines.

By comparing the frequency of the ring oscillator 140 when the aggressor line 120 is not present, with the frequency of the ring oscillator 140 when the aggressor line is present, the effect of the aggressor line on the victim line 110 can be easily measured. Note that though in this example we reference a "victim line" and an "aggressor line" in a real configuration, a victim line can also be an aggressor at the same time. In one embodiment, the data built up based on the information from the ring oscillator is used to characterize the circuit, and can be used in future design for similar circuits.

Figure 4:
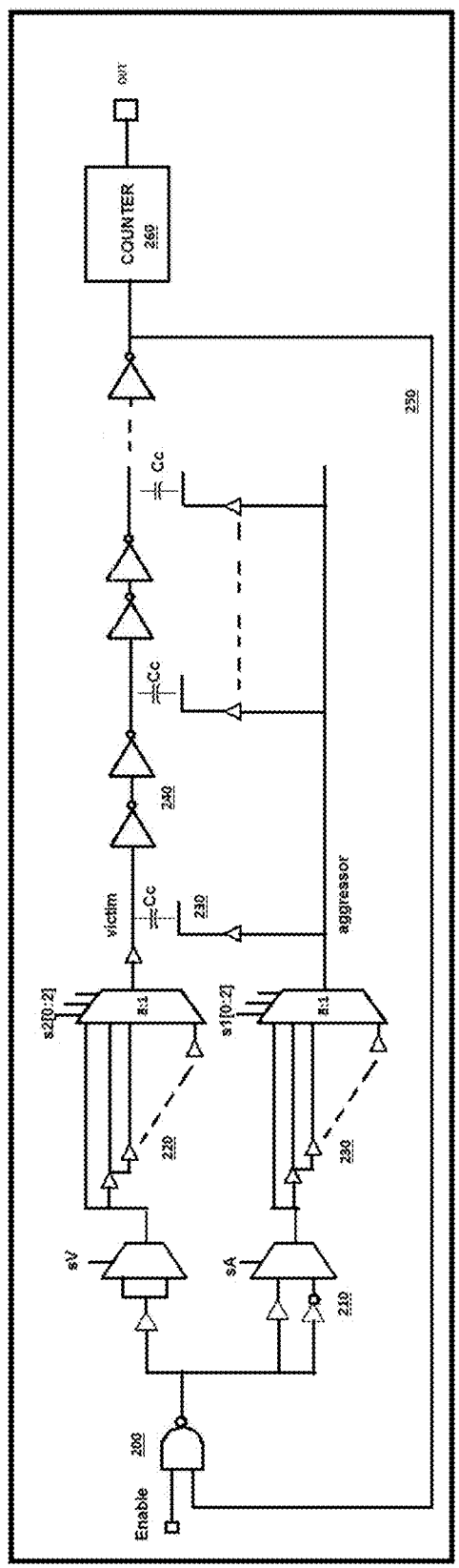
FIG. 4 is the circuit diagram of one embodiment of the invention showing a single aggressor/victim pair.

FIG. 4 is the circuit diagram of one embodiment of the invention showing a single aggressor/victim pair. In one embodiment, the driven victim net to be characterized is segmented into buffered sectors 240 to preserve the integrity of the driven signal, the phase relation between the aggressor and the victim is controlled through multiplexing circuits 210 that control the polarity, and the phase incidence in multiples of 1 buffer delay 220, 230.

In one embodiment, the output of the driven victim net is passed to a gated ring oscillator 250 to translate the delay of the victim path into a frequency that can be measured directly. In one embodiment, the frequency is measured through a counter 260. In another embodiment, the frequency is measured through a divide-by circuit. The translation of the delay to a frequency allows for the capture of small increments of time measurement differentials caused by various aggressor phase relations to the victim, which are difficult to quantify in an accurate fashion otherwise. Because the output of the ring oscillator or other sensor is immediately impacted by the changes in the voltage, the measurement is referred to as being in pseudo-real time.

Figure 5:
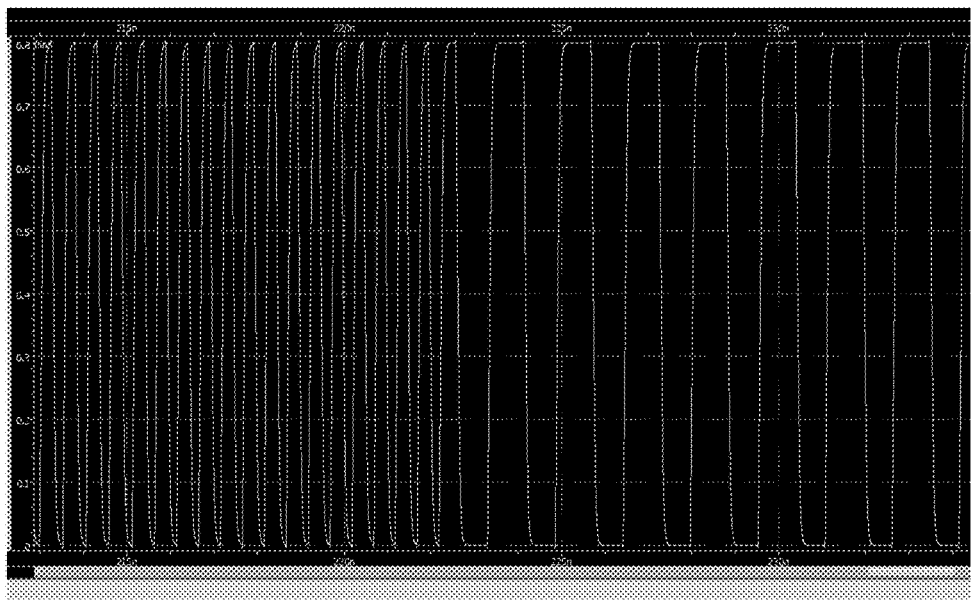
FIG. 5 is a representative simulation output of one embodiment of the invention showing the change in oscillation frequency of the ring oscillator (RO) of the invention used to capture the impact of phase relation between an aggressor and a victim.

FIG. 5 is a representative simulation output showing the change in oscillation frequency of the ring oscillator (RO) used to capture the impact of phase relation between an aggressor and a victim. The change in the switching time of a victim path is displayed over time, beginning with the presence of a capacitively coupled and simultaneously switching in-phase aggressor and transitioning gradually through to the presence of a capacitively coupled and simultaneously switching opposite phase aggressor. The change in the switching time of the victim path is captured through the change in frequency of the ring oscillator (RO) through the victim path.

Figure 6:
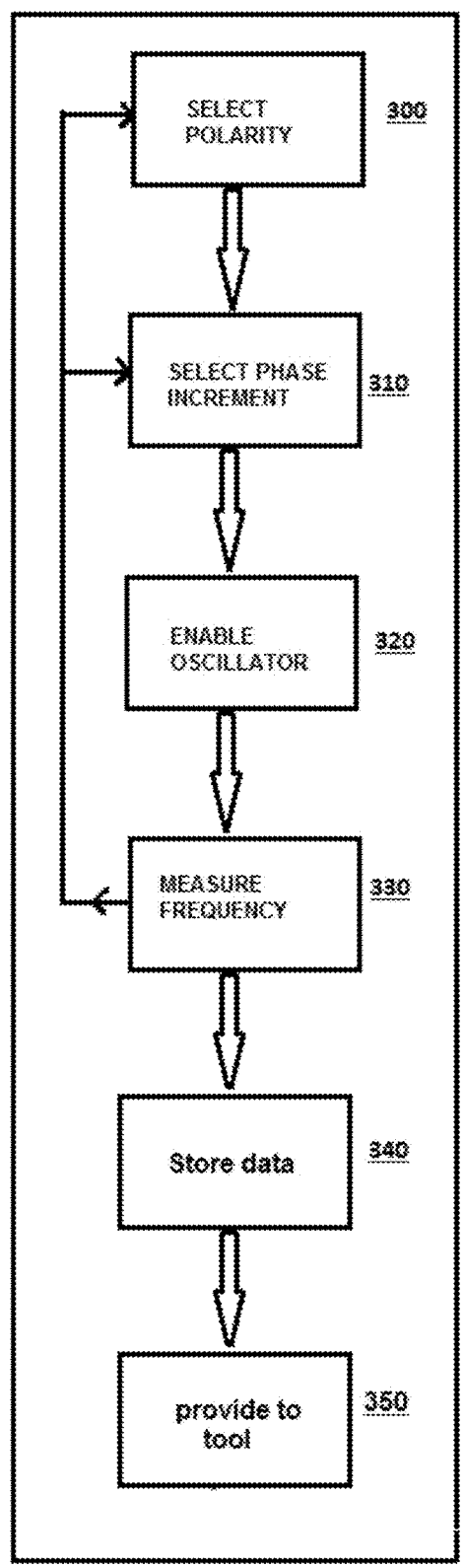
FIG. 6 is a flow chart of the operation and utilization of one embodiment of the invention

FIG. 6 is a flow chart describing one embodiment of the characterization procedure for characterization of the timing impact of an aggressor on a capacitively coupled victim across a full range of phase relation between the aggressor and victim. The polarity of the aggressor is selected in Block 300. The phase increment of the aggressor is selected at Block 310. The oscillator is enabled at Block 320. The frequency is measured at Block 330. In one embodiment, the process stores the frequency data from the ring oscillator at Block 340. If not all desired phases have been tested for the current polarity, the process returns to block 310 to select the next phase increment, and test it. If additional polarities should be tested, they are selected by returning to Block 300, selecting the next polarity and testing it.

At block 340, the characterization data is stored. At block 350, the characterization data is made available for use in circuit designs. In one embodiment, a characterization table is built up from the data obtained during testing, in Block 340. The characterization data from stored data in Block 340 may be used in generating NBTI simulation models. These simulation models may be used to calibrate Electronic Design Automation (EDA) generated models and EDA simulator models. The characterization, in one embodiment, is applicable to future circuit designs that share the same metal and spacing as was used in the testing system. The process then ends.

Figure 7:
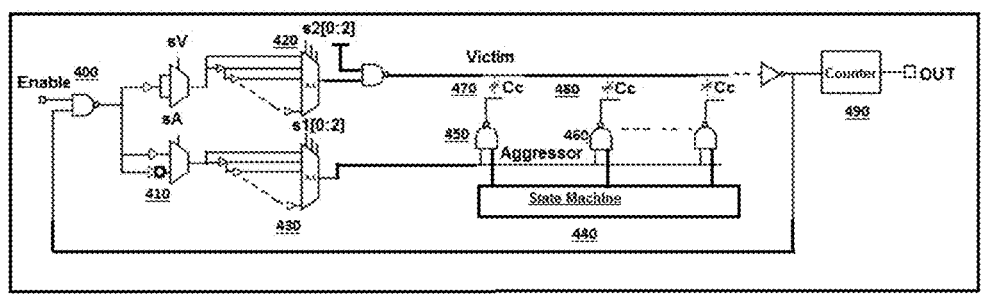
FIG. 7 is the circuit diagram of one embodiment of the invention showing a single aggressor/victim pair but allowing for incremental activation of capacitive coupling.

FIG. 7 is another embodiment of the invention wherein the characterization is extended to a variable capacitive coupling. The phase relation between the aggressor and the victim is controlled through input buffers 410 which can change the relationship of the signals on the victim line and the aggressor line from constructive to destructive interference. In one embodiment, the input buffers 410 are multiplexing circuits 410 that control the polarity, and the phase incidence in multiples of 1 buffer delay 420, 430. In one embodiment, a ring oscillator 490 translates the voltage output by the victim line into a frequency. In one embodiment, the frequency is measured through a counter 490. In another embodiment, the frequency is measured through a divide-by circuit, or another circuit element that can take as an input the output voltage of the victim line, and output a corresponding frequency.

In one embodiment, this configuration enables the switching in of capacitive elements, to provide variable capacitive coupling that can be measured at a fine-grained level 470, and may additionally be measured at a gross level 450, 460, and 480 through controlling the switching blocks via a state machine 440. The switching blocks 450, 460 couple their respective coupling capacitances into the circuit. Thus, the level of capacitance that is experienced by the victim circuit may be varied.

Figure 8:
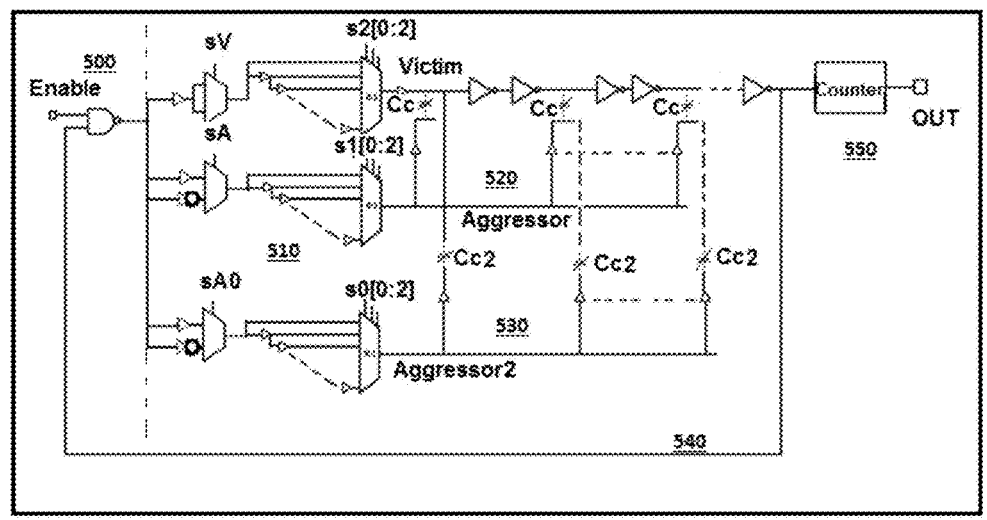
FIG. 8 is the circuit diagram of one embodiment of the invention showing the case for a multiple aggressor/victim pair scenario.

Referring to FIG. 8 in another embodiment of the invention the characterization is extended to multiple aggressors 520 and 530. The driven victim net to be characterized is segmented into buffered sectors to preserve the integrity of the driven signal, the phase relation between the aggressor and the victim is controlled through multiplexing circuits 510 that control the polarity, and the phase incidence in multiples of one buffer delay. In one embodiment, the driven victim net is configured into a gated ring oscillator 540 to translate the delay of the victim path into a frequency that can be measure through a variety of ways. In one embodiment, ring oscillator 540 is enabled through gate 500. In one embodiment, the frequency is measured through a counter 560. When testing the effect of multiple aggressors on a victim line, the phase and polarity on each of the aggressors may be varied with respect to the victim line and the other aggressors. This configuration is more likely to be present in a production circuit and provides a broader set of data.

Figure 9:
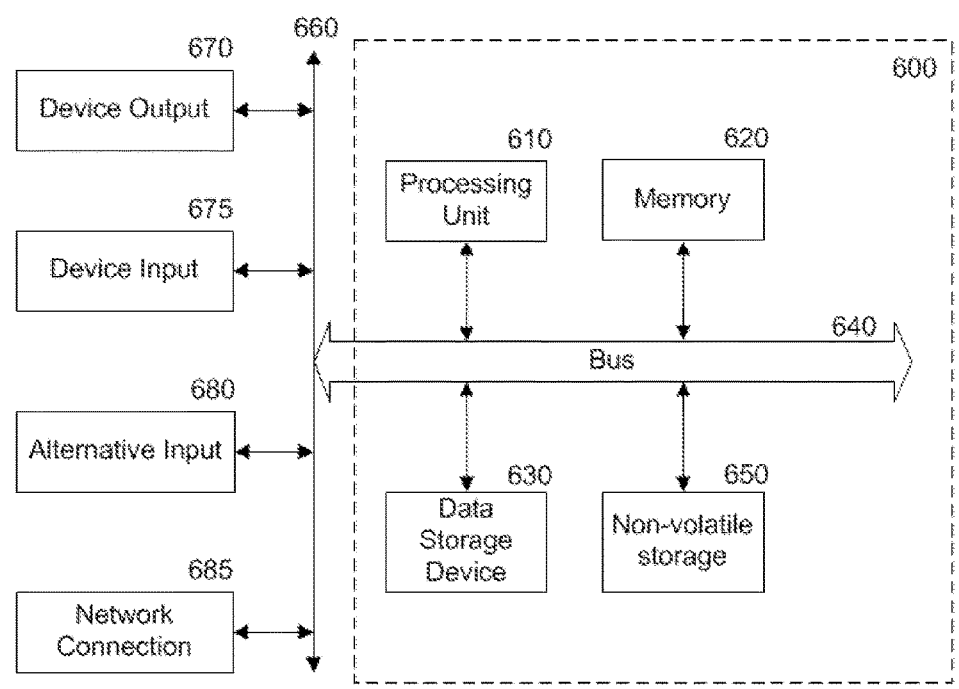
FIG. 9 is one embodiment of a computer system that may be used with the present invention.

FIG. 9 is a block diagram of a particular machine that may be used with the present invention. It will be apparent to those of ordinary skill in the art, however that other alternative systems of various system architectures may also be used.

The data processing system illustrated in FIG. 9 includes a bus or other internal communication means 640 for communicating information, and a processing unit 610 coupled to the bus 640 for processing information. The processing unit 610 may be a central processing unit (CPU), a digital signal processor (DSP), or another type of processing unit 610.

The system further includes, in one embodiment, a random access memory (RAM) or other volatile storage device 620 (referred to as memory), coupled to bus 640 for storing information and instructions to be executed by processor 610. Main memory 620 may also be used for storing temporary variables or other intermediate information during execution of instructions by processing unit 610.

The system also comprises in one embodiment a read only memory (ROM) 650 and/or static storage device 650 coupled to bus 640 for storing static information and instructions for processor 610. In one embodiment, the system also includes a data storage device 630 such as a magnetic disk or optical disk and its corresponding disk drive, or Flash memory or other storage which is capable of storing data when no power is supplied to the system. Data storage device 630 in one embodiment is coupled to bus 640 for storing information and instructions.

The system may further be coupled to an output device 670, such as a cathode ray tube (CRT) or a liquid crystal display (LCD) coupled to bus 640 through bus 660 for outputting information. The output device 670 may be a visual output device, an audio output device, and/or tactile output device (e.g. vibrations, etc.)

An input device 675 may be coupled to the bus 660. The input device 675 may be an alphanumeric input device, such as a keyboard including alphanumeric and other keys, for enabling a user to communicate information and command selections to processing unit 610. An additional user input device 680 may further be included. One such user input device 680 is cursor control device 680, such as a mouse, a trackball, stylus, cursor direction keys, or touch screen, may be coupled to bus 640 through bus 660 for communicating direction information and command selections to processing unit 610, and for controlling movement on display device 670.

Another device, which may optionally be coupled to computer system 600, is a network device 685 for accessing other nodes of a distributed system via a network. The communication device 685 may include any of a number of commercially available networking peripheral devices such as those used for coupling to an Ethernet, token ring, Internet, or wide area network, personal area network, wireless network or other method of accessing other devices. The communication device 685 may further be a null-modem connection, or any other mechanism that provides connectivity between the computer system 600 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 620, mass storage device 630, or other storage medium locally or remotely accessible to processor 610.

It will be apparent to those of ordinary skill in the art that the system, method, and process described herein can be implemented as software stored in main memory 620 or read only memory 650 and executed by processor 610. This control logic or software may also be resident on an article of manufacture comprising a computer readable medium having computer readable program code embodied therein and being readable by the mass storage device 630 and for causing the processor 610 to operate in accordance with the methods and teachings herein.

The present invention may also be embodied in a handheld or portable device containing a subset of the computer hardware components described above. For example, the handheld device may be configured to contain only the bus 640, the processor 610, and memory 650 and/or 620.

The handheld device may be configured to include a set of buttons or input signaling components with which a user may select from a set of available options. These could be considered input device #1 675 or input device #2 680. The handheld device may also be configured to include an output device 670 such as a liquid crystal display (LCD) or display element matri6 for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 610, a data storage device 630, a bus 640, and memory 620, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 685.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infra-red signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A circuit including capacitive coupling comprising:
a victim line to be tested;
a first aggressor line, running alongside the victim line, creating a coupling capacitance between the victim line and the first aggressor line; and
a sensor circuit coupled to the victim line, to detect effects of the first aggressor line on the victim line, the sensor circuit measuring timing effects of the capacitive coupling in pseudo-real time and storing the measured time effects for use by an EDA system for designing circuit layout, wherein the sensor circuit is a ring oscillator, the circuit further comprising a feedback loop from an output of the ring oscillator to the victim line.

2. The circuit of claim 1, further comprising:
a plurality of coupling capacitances distributed along the victim line and the first aggressor line, to distribute the capacitance along the lines.

3. The circuit of claim 2, further comprising:
a plurality of buffers placed along the victim line and the aggressor line, the plurality of coupling capacitances connected between the lines separated by the buffers.

4. The circuit of claim 3, wherein the buffer along the victim line and the corresponding buffer along the aggressor line are matched in size.

5. The circuit of claim 3, wherein measurements are taken along the victim line between the buffers to allow different measurements of capacitive coupling on the victim line.

6. The circuit of claim 1, further comprising:
a second aggressor line, running alongside the victim line, allowing detection of the effects of the combination of the first and second aggressor line on the victim line.

7. The circuit of claim 1, wherein measurements taken along the victim line are used to build a characterization table for use in circuit design.

8. The circuit of claim 1, further comprising:
input buffers to buffer inputs to the victim line and the aggressor line, the buffered inputs allowing adjustment of the signal of the victim line and the aggressor line from constructive interference to destructive interference.

9. The circuit of claim 8, wherein the adjustment of capacitive offset is performed by the buffered inputs.

10. A method for capturing capacitive coupling in an integrated circuit, performed by the integrated circuit, comprising:
measuring the output of a victim line of the integrated circuit, the integrated circuit including a plurality of lines carrying signals, the plurality of lines creating capacitive coupling between the victim line and a first aggressor line, the first aggressor line running alongside the victim line in the integrated circuit, the measuring performed through a sensor circuit coupled to the victim line, to detect timing effects of the first aggressor line on the victim line, the sensor circuit measuring the timing effects in pseudo-real time, wherein the sensor circuit is a ring oscillator, the circuit further comprising a feedback loop from an output of the ring oscillator to the victim line; and
distributing the capacitive coupling along the victim line and the first aggressor line; and storing the measured output of the victim line so that the measured output can be use by an EDA system for designing circuit layout.

11. The method of claim 10, wherein the measuring may be measured between buffers in the integrated circuit separating the capacitive coupling elements.

12. The method of claim 10, further comprising:
when the integrated circuit comprises a second aggressor line running alongside the victim line, detecting the effects of the combination of the first and second aggressor line on the victim line.

13. The method of claim 10, further comprising:
building a characterization table based on the output of the sensor circuit, for use in circuit design.

14. The method of claim 10, further comprising:
adjusting timing of the signal for the victim line and the aggressor line from constructive interference to destructive interference.

15. A system to characterize an impact of capacitive coupling comprising:
a circuit including a victim line and a first aggressor line, the first aggressor line running alongside the victim line, creating a plurality of coupling capacitance factors between the victim line and the first aggressor line, and a sensor circuit coupled to the victim line, to detect effects of the first aggressor line on the victim line, the sensor circuit measuring timing effects in pseudo-real time, wherein the sensor circuit is a ring oscillator, the circuit further comprising a feedback loop from an output of the ring oscillator to the victim line;
a memory to store the measured timing effects; and
an electronic design automation (EDA) tool to utilize the measured timing effects in designing circuit layouts.

16. The system of claim 15, further comprising:
a plurality of matched buffers placed along the victim line and the first aggressor line, the plurality of coupling capacitances connected between the lines separated by the plurality of matched buffers.

17. The system of claim 16, wherein the measurements are taken along the victim line between the buffers, to allow different measurements of capacitive coupling on the victim line.

18. The system of claim 15, further comprising:
input buffers to adjust the signal switching in the victim line and the aggressor line to test from constructive interference to destructive interference.

* * * * *